Oct. 16, 1956  J. S. ROBBINS  2,766,976
CUTTING AND CORE BREAKING UNIT FOR BORING HEAD
Filed Dec. 16, 1954

INVENTOR.
James S. Robbins
BY
Murray G. Gleeson
ATTORNEY

United States Patent Office 2,766,976
Patented Oct. 16, 1956

2,766,976

CUTTING AND CORE BREAKING UNIT FOR BORING HEAD

James S. Robbins, Chicago, Ill., assignor to Goodman Manufacturing Company, Chicago, Ill., a corporation of Illinois Application December 16, 1954, Serial No. 475,791

4 Claims. (Cl. 262—7)

This invention relates to improvements in cutter heads for boring machines and more particularly to a center cutting and dislodging unit for use on such machines.

The principal object of the invention is to provide an improved and simplified form of center cutting and dislodging unit for machines of the character mentioned, provided with a novel form and arrangement of rollers disposed immediately adjacent the center burster cone for cutting or rolling off, in glass-cutter fashion, the standing core of material left between the burster cone and adjacent kerf cutting elements carried on the face of the boring head.

The invention may best be understood by reference to the accompanying drawings, in which.

Figure 1:
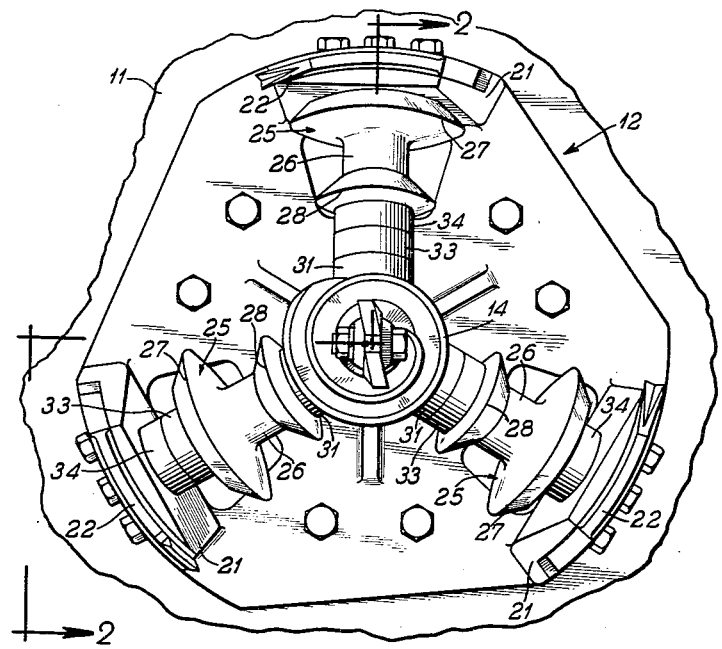
Figure 1 is a fragmentary face view of the center portion of a boring head made in accordance with the present invention.

Referring to details of the embodiment of the invention shown in the drawings, 10 indicates the drive shaft of a boring head having a disc-like boring plate 11 thereon. The drawings show only a small center area of the boring plate 11, upon which is mounted a center cutting and dislodging unit, indicated generally at 12, which constitutes an illustrative form of the subject matter of the present invention. In practice the main body of the boring plate 11 extends radially to a diameter many times larger than that of the center unit and has numerous individual cutting and dislodging devices (not shown) mounted on the front surface thereof, as, for instance, disclosed in my copending application bearing Serial No. 473,847, filed December 8, 1954.

The center cutting and dislodging unit includes a center burster cone indicated at 14, having a radially extending base portion 15 suitably fixed in forwardly projecting axial relation to the boring plate 11. The front end of said burster cone is of more or less conventional shape, including a forwardly tapered portion 16 having an integrally formed spiral thread 17 thereon, with a cutter bit 18 of the fishtail type secured at its apex. The tapered portion 16 merges into the central generally cylindrical portion 20 adjacent the base 15.

The outer periphery of the base 15 is provided with a plurality of similar cutter supports 21 (herein three in number) radially spaced equidistant relation to the center cone and at substantially equal circumferential angles about the axis of rotation of the cutter head. Each of these cutter bit supports 21 has a cutter bit 22 secured thereto consisting of a shank 23 with a cutter blade 24 at its forward leading edge. In the form shown, the shanks 23 of the several cutter bits are curved along similar arcs to conform substantially with the path of movement of the cutter blades 24. As will be seen from Figure 2, the cutter bits 22 project forwardly over a portion of the length of the center burster cone 14, and said bits are relatively thin to cut a narrow circular kerf indicated at A in Figure 2, while the center cone cuts a substantially tapered pilot hole indicated at B in the same figure. It will thus be seen that when the boring head is cutting in solid material, a circular core indicated at C is left standing between the kerf A and the pilot hole B, which core must be broken down as forward progress of the boring head continues.

A plurality of core-breaking rollers 25 are provided to operate in the space between the cutter bits 22 and the center cone 14 to break down the core C. In the preferred form shown, the core-breaking rollers 25 are identical with each other, each comprising a hub 26 and a plurality (herein two) of integral peripheral cutting edges 27, 28, which cutting edges are generally V-shaped in cross section. As the core breakers are primarily designed to roll against the working face in circular paths, the outer peripheral cutting edge 27 is of considerably greater diameter than the inner cutting edge 28, so that the action of the two edges against the face may approximate a true simultaneous rolling action.

Each of the rollers is rotatably mounted on a shaft 30 having its inner end fixed in a boss 31 on the cylindrical portion 20 of the center cone 14 and its outer end fixed in the cutter support 21. The axis of the shaft extends radially outward from the axis of rotation of the cutter head and leans backwardly or rearwardly from the center burster cone 14 at such an angle of inclination that the peripheries of the cutting edges 27 and 28 in their forwardmost position are in a plane disposed substantially at right angles to the axis of rotation of the cutter head.

With this arrangement, both cutting edges 27 and 28 will rotate with substantially the same peripheral rolling speed in the plane perpendicular to the axis of the cutter head, with said cutting edges, in effect, coincident with the surface of a cone having its apex at the axis of rotation of the cutter head.

As has been described in somewhat greater detail in connection with somewhat similar core breaking rollers disclosed in my copending application Serial No. 473,847, I have found that under many working conditions improved core breaking action can be obtained by providing a slight variation in the ratio of the diameters of the cutting edges from those prescribed above for true simultaneous rolling action of both cutting edges. In other words, if the diameters of the cutting edges 27 and 28 are not exactly coincident with the surface of a cone having its apex at the axis of rotation of the cutting head, then only one of the two cutting edges tends to have true rolling contact against the working face at any one instant, while the other cutting edge tends to be rotated by the cutter head at a slightly different, partly slipping, circumferential speed, relative to the face (either faster or slower than that of the first cutting edge), depending upon which cutting edge meets with the most frictional resistance against the face at any given instant.

It appears that in practice this slight difference in circumferential speeds of the two cutting edges usually tends to alternate from one cutting edge to the other as the greater relative frictional resistance changes from one cutting edge to the other, when the faces of their respective cores alternately give way to said cutting edges. Thus one or the other cutting edge may be either dragging behind or moving ahead of the other cutting edge at any one instant, so as to produce especially effective alternating cutting and wedging actions upon the cores between the kerfs.

It will also be observed that the rollers 25 are considerably shorter than the bearing surfaces of the shafts 30 on which said shafts are rotatably mounted, and that a plurality of spacing rings 33, 34 are also mounted on the shafts 30 in varying relations with respect to the ends of said rollers, so that the cutting edges 27 and 28 on said rollers will assume different cutting positions lengthwise of their shaft 30, depending upon the relative positions of the spacing rings 33, 34.

Figure 2:
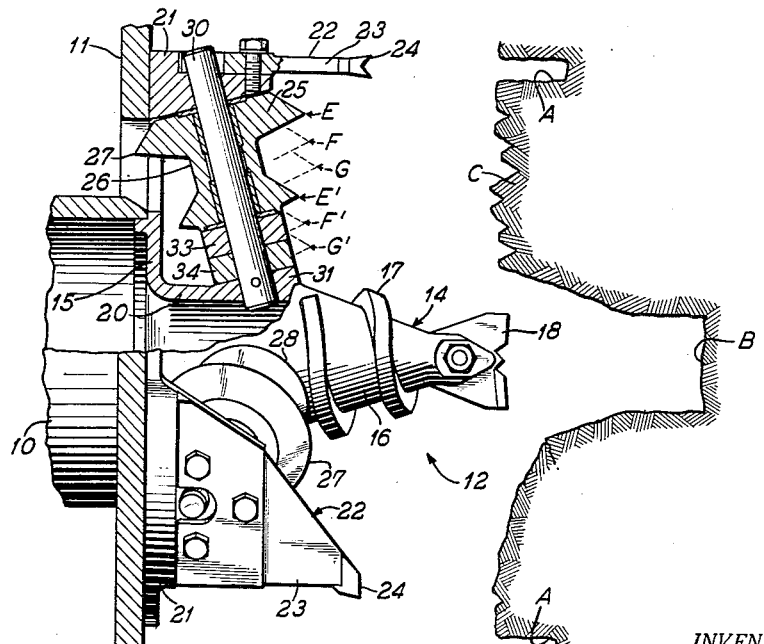
Figure 2 is a side view in part section of the center portion of the boring head shown in Figure 1, with the boring head backed away from the working face which has been previously cut thereby.

Thus, as seen in Figures 1 and 2, the uppermost roller 25 has both of its spacing rings 33 and 34 mounted on its shaft at the inner end of said roller so as to cause the roller to assume an outermost cutting position with its cutting edges 27 and 28 occupying the circular cutting paths indicated at E, E' in Figure 2. The roller on the lower right-hand side of Figure 1 has its spacing rings 33 and 34 mounted on its shaft at opposite ends of the roller so that the roller occupies an intermediate cutting position with its cutting edges following circular cutting paths indicated by dotted lines at F, F' in Figure 2. The roller at the lower left-hand side of Figure 1 has both spacing rings 33 and 34 mounted on the shaft at the outer end of said roller so that the roller 25 occupies its innermost cutting position in which its cutting edges 27, 28 follow a path indicated by dotted lines at G, G' in Figure 2.

With the use of spacing rings 33 and 34 in varying relation as above described, the several core breaking rollers may be of identical size and construction so as to be fully interchangeable with each other for initial assembly or subsequent substitution.

Although I have shown and described certain embodiments of my invention, it will be understood that I do not wish to be limited to the exact construction shown and described but that various changes and modifications may be made without departing from the spirit and scope of the invention as defined by the appended claims.

I claim:

1. A center cutting and core breaking unit for a rotary type cutter head, said unit including a forwardly extending axially mounted burster cone having a tapered forward portion, an intermediate portion and a radially extending base portion, a plurality of circumferentially spaced cutter supports on the peripheral edge of said base portion, forwardly projecting kerf cutters fixed on said cutter supports in radially spaced relation to said burster cone for cutting a circular kerf, a plurality of shafts extending substantially radially from said intermediate portion to said cutter supports and being disposed in substantially equally circumferentially spaced relation to the axis of the cone in the space between the cone and the kerf cutters, a core breaking roller mounted on each shaft and spacer rings interchangeably positioned on each shaft cooperable therewith in predetermined relation adjacent the ends of the respective rollers to radially space each roller a different distance from the axis of the cone.

2. The structure defined in claim 1 wherein the spacer rings on one of the shafts are positioned only intermediate the radial outer end of the roller on said shaft and the adjacent cutter support, the rings on another of said shafts being positioned only intermediate the radial inner end of the roller on said another shaft and the adjacent portion of the cone, and the rings on a further shaft being positioned both intermediate the radial outer end of the roller on said further shaft and the adjacent cutter support and intermediate the radial inner end of the roller on said further shaft and the adjacent portion of said cone.

3. The structure defined in claim 1 wherein each of said shafts are disposed in a rearwardly inclined position in relation to the axis of said cone, and said rollers each have a plurality of axially spaced peripheral cutting edges generally V-shaped in cross-section and of different diameters increasing toward the outer end of the roller, said inclined disposition of each shaft and the differential diameter of the cutting edges of each roller affording aproximate true simultaneous rolling action of the several cutting edges when thrust against a working face disposed in a plane perpendicular to the axis of the cone.

4. A center cutting and core breaking unit for a rotary type cutter head, said unit comprising, in combination, a forwardly extending, axially mounted burster cone having a tapered forward portion, a cylindrical central portion and a radially extending base portion rearwardly spaced from said forward portion, an axially mounted pilot bit carried by the forward portion of said cone for cutting a pilot bore concentric to the axis of rotation of said cone and in advance thereof, said base portion having a plurality of circumferentially spaced cutter supports on the peripheral edge thereof, forwardly projecting kerf cutters fixed on said cutter supports in radially spaced relation to said pilot bit for cutting a circular kerf defining with the pilot bit bore an outstanding annular core, said tapered portion of said cone being small enough to enter the pilot bore cut by said bit to apply radial compressive forces on the surface of the annular core, a plurality of shafts extending substantially radially and inclined rearwardly from bosses on the central portion of the burster cone to said cuter supports and terminating in openings defined in said supports, said shafts being disposed in substantially equally circumferentially spaced relation to the axis of the burster cone in the space defined between the cone and the kerf cutters, a cone breaking roller mounted on each shaft, said rollers being identical and interchangeable with each roller having at least one peripheral cutting edge generally V-shaped in cross-section for dislodging the stressed surface of the annular core with a glass-cutter-like action and spacer rings interchangeably positioned on each shaft cooperable therewith in predetermined desired relation adjacent the ends of the respective roller to radially space each roller a different distance from the axis of the burster cone.

References Cited in the file of this patent

UNITED STATES PATENTS

| | | |
|---|---|---|
| 1,640,644 | Bullum | Aug. 30, 1927 |
| 1,868,348 | DeCosta | July 19, 1932 |
| 2,161,000 | Andersen | June 6, 1939 |
| 2,370,070 | Phipps | Feb. 20, 1945 |
| 2,550,202 | Robbins | Apr. 24, 1951 |

FOREIGN PATENTS

| | | |
|---|---|---|
| 851,333 | Germany | Oct. 2, 1952 |